United States Patent [19]

Morita et al.

[11] Patent Number: 4,819,603

[45] Date of Patent: Apr. 11, 1989

[54] SYSTEM AND METHOD FOR CONTROLLING IGNITION TIMING FOR AN INTERNAL COMBUSTION ENGINE

[75] Inventors: Tatsuo Morita, Yokosuka; Terufumi Hidaka, Yokohama; Yuichi Kashimura, Katsuta, all of Japan

[73] Assignees: Nissan Motor Company, Limited, Kanagawa; Hitachi, Ltd., Tokyo, both of Japan

[21] Appl. No.: 921,484

[22] Filed: Oct. 22, 1986

[30] Foreign Application Priority Data

Oct. 22, 1985 [JP] Japan ................... 60-235817

[51] Int. Cl.⁴ ............................. F02P 5/15
[52] U.S. Cl. .................................. 123/425
[58] Field of Search ................. 123/425, 435

[56] References Cited

U.S. PATENT DOCUMENTS

| | | | |
|---|---|---|---|
| 4,351,281 | 9/1982 | Geiger et al. | 123/425 |
| 4,513,716 | 4/1985 | Haraguchi et al. | 123/425 |
| 4,513,717 | 4/1985 | Kobayashi | 123/425 |
| 4,517,944 | 5/1985 | Inoue | 123/425 |
| 4,517,945 | 5/1985 | Ishigami et al. | |
| 4,517,952 | 5/1985 | Hosoya . | |
| 4,582,032 | 4/1986 | Hara et al. | 123/339 |
| 4,586,474 | 5/1986 | Akasu | 123/425 |
| 4,590,565 | 5/1986 | Takasu | 123/425 |
| 4,601,272 | 7/1986 | Nagai | 123/425 |
| 4,631,680 | 12/1986 | Korb | 123/425 |
| 4,640,249 | 3/1987 | Kawamura et al. | |
| 4,640,250 | 2/1987 | Hosaka et al. | |
| 4,658,787 | 4/1987 | Takizawa . | |
| 4,658,789 | 4/1987 | Morita | 123/425 |
| 4,660,535 | 4/1987 | Asano . | |

FOREIGN PATENT DOCUMENTS

| | | |
|---|---|---|
| 0022159 | 1/1981 | European Pat. Off. . |
| 0084368 | 7/1983 | European Pat. Off. . |
| 0096869 | 12/1983 | European Pat. Off. . |
| 2925770 | 1/1980 | Fed. Rep. of Germany . |
| 2930540 | 2/1981 | Fed. Rep. of Germany . |
| 3116593 | 11/1982 | Fed. Rep. of Germany . |
| 3227783 | 2/1983 | Fed. Rep. of Germany . |
| 2169959 | 7/1986 | United Kingdom . |
| 2169958 | 7/1986 | United Kingdom . |
| 2169955 | 7/1986 | United Kingdom . |

Primary Examiner—Tony M. Argenbright
Attorney, Agent, or Firm—Foley & Lardner, Schwartz, Jeffery, Schwaab, Mack, Blumenthal & Evans

[57] ABSTRACT

A system and method for controlling an ignition timing for an internal combustion engine. In the ignition timing control system and method, with a retardation angle correction amount stored as a learning value according to an engine operating region, a newly learned learning value is used as the retardation angle correction amount so that an optimum retardation angle correction amount can be provided regardless of an individual difference in engine performance and of an operating environment. Consequently, an effective suppression of occurrence of engine knocking can be achieved and engine performance and fuel economy can be improved. In addition, since the updating of the learning value is inhibited only when an engine revolutional speed is increased, an opportunity of updating the learning value is increased so that the learning value can always be set at optimum.

9 Claims, 7 Drawing Sheets

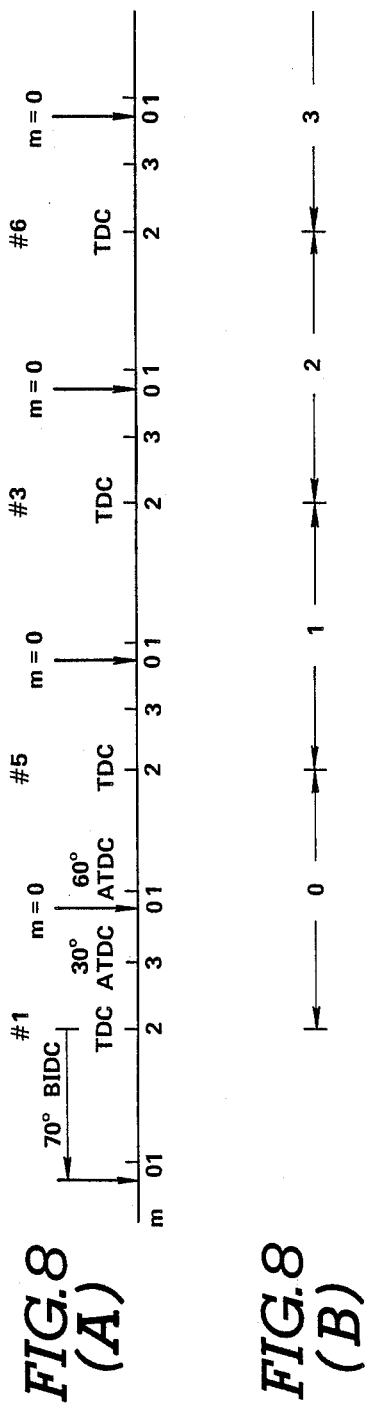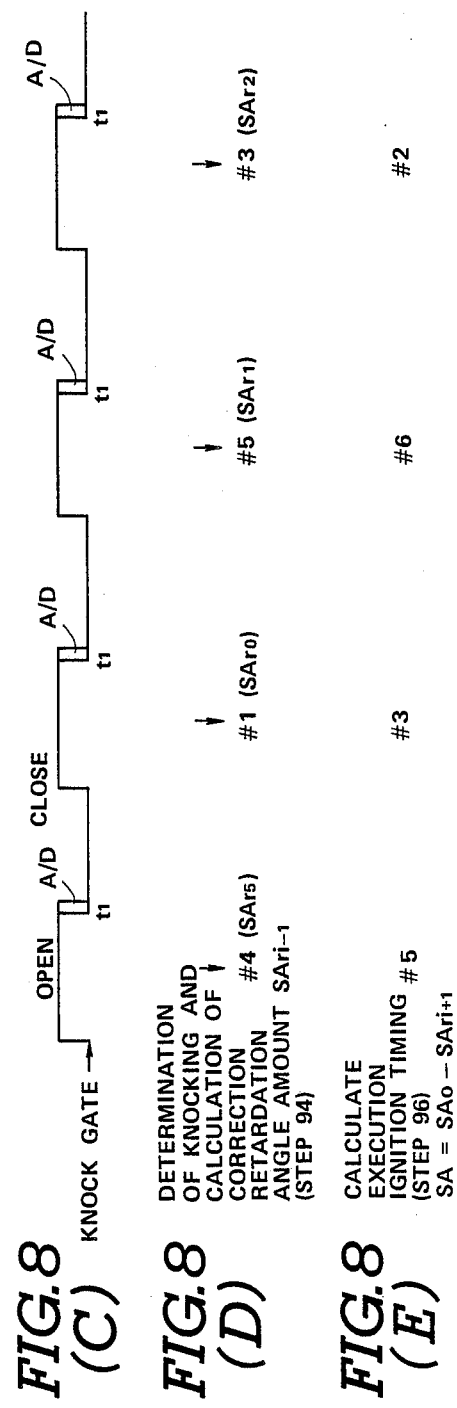

SYSTEM AND METHOD FOR CONTROLLING IGNITION TIMING FOR AN INTERNAL COMBUSTION ENGINE

BACKGROUND OF THE INVENTION

1. Field of the Invention

The present invention relates to a system and method for controlling ignition timing for an internal combustion engine and particularly relates to the system and method for controlling the ignition timing applicable to vehicular engines which suppress engine knocking and thus improve engine performance, using a learning control method.

2. Description of the Prior Art

Ignition timing for an internal combustion engine must be determined in relation to engine operating conditions so that the engine is operated optimally.

In general, taking efficiency and fuel economy of the engine into account, it is most preferable to ignite each of the engine cylinders at a timing in the vicinity of a minimum advance angle in order to generate maximum engine torque, i.e., to provide so called MBT (Minimum advance for Best Torque). Therefore, it is necessary to change the ignition timing to the MBT state according to the engine operating conditions.

However, since engine knocking tends to occur under certain engine operating conditions when the ignition timing is advanced, a stable engine operation cannot be achieved. For example, engine knocking tends to occur under transient engine operating conditions.

One ignition timing control system which prevents engine knocking during engine transient operating states is disclosed in Japanese Patent Application Unexamined Open No. Sho 60-26170 published on Feb. 9, 1985.

In the above-identified Japanese Patent Application document, the control system continually checks to see whether the engine is accelerating and when the engine is accelerating, it reads out one of a plurality of retardation angle correction amounts preallocated according to the instantaneous throttle valve opening angle and according to the rate of change of the throttle valve opening angle. A basic ignition timing value determined according to engine operating conditions is corrected on the basis of the preallocated retardation angle correction amount. In this way, the engine knocking can be avoided by using the resulting ignition timing angle as the actual ignition timing.

However, since in this conventional ignition timing control system, the basic ignition timing is corrected on the basis of a preallocated retardation angle correction amount during engine acceleration, the magnitude of the preallocated retardation angle correction amount must be set toward the retardation angle side of optimal in order to allow for differences in individual engine performance and engine operating environment. Consequently, the actual ignition timing will tend to be excessively retarded so that engine performance during transient states is degraded.

SUMMARY OF THE INVENTION

With the above-described problem in mind, it is an object of the present invention to provide a system and method for controlling ignition timing for an internal combustion engine which prevents excessive retardation of ignition timing and which improves engine performance even under engine transient operating conditions.

The above-described object can be achieved by a system for controlling ignition timing for an internal combustion engine, comprising: (a) first means for detecting an engine operating condition; (b) second means for detecting an occurrence of engine knocking in the engine; (c) third means for determining a current engine operating region on the basis of the engine operating condition detected by the first means; (d) fourth means for setting a basic ignition timing angle on the basis of the engine operating condition detected by the first means; (e) fifth means for learning a retardation angle correction amount by which the set basic ignition timing angle is corrected toward a retardation angle side so as to suppress the engine knocking when the second means detects the occurrence of engine knocking as that corresponds to the similar engine operating region and storing a learning value of the retardation angle correction amount into a predetermined memory area allocated according to the corresponding engine operating region; (f) sixth means for reading the learning value as the retardation angle correction amount when the engine operating region is changed to a predetermined engine operating region from the predetermined area in the fifth means; (g) seventh means for calculating the retardation angle correction amount on the basis of the retardation angle correction amount read by the sixth means and depending on whether the engine knocking occurs when the engine operating region remains unchanged and when the engine operating region is changed to the predetermined operating region; and (h) eighth means for producing an ignition signal upon the receipt of which air-fuel mixture supplied to the engine is ignited at a timing of the set basic ignition timing angle which is corrected by the retardation angle correction amount calculated by the seventh means.

The above-described object can be achieved by a method for controlling an ignition timing for an internal combustion engine, comprising the steps of: (a) detecting a peak value of a magnitude of an engine cylinder pressure vibration during a predetermined interval of a crank angular displacement; (b) detecting an engine operating condition; (c) determining an engine operating region on the basis of the engine operating condition detected in the step (b); (d) detecting whether the current engine operating region is changed from the previous engine operating region; (e) reading a learning value allocated to predetermined one of the engine operating regions when the engine operating region is changed; (f) storing the learning value as a retardation angle correction amount ($SA_{ri}$) for each engine cylinder; (g) reading a reference value (S/L) preallocated to the engine operating condition detected in the step (b) when the engine operating region is not changed and when an acceleration operation is carried out on the basis of the change in the engine operating region; (h) determining whether an engine knocking occurs on the basis of a comparison result between the preallocated reference value and the peak value detected in the step (a); (i) calculating the retardation angle correction amount depending on whether the engine knocking occurs determined in the step (h); (j) determining whether a predetermined interval during which the operating region has changed has elapsed; (k) calculating an average value of the retardation angle correction amount ($SA_{r0}$ through $SA_{r5}$) and storing the average value in a predetermined engine operating region as the learning value when the predetermined interval in the step (j) has elapsed; (λ) determining a basic ignition timing angle value on the basis of the engine operating condition detected in the step (b); (m) calculating an ignition timing to be executed from the basic ignition timing angle value determined in the step (λ) and the retardation angle correction amount allocated to each cylinder; and (n) igniting air-fuel mixture supplied to each cylinder at the ignition timing calculated in the step (m).

BRIEF DESCRIPTION OF THE DRAWINGS

FIGS. 8(A) through 8(E) are operational timing charts for explaining the operation of the control circuit;

DETAILED DESCRIPTION OF THE PREFERRED EMBODIMENT

Reference will hereinafter be made to the drawings in order to facilitate understanding of the present invention.

Figure 1:
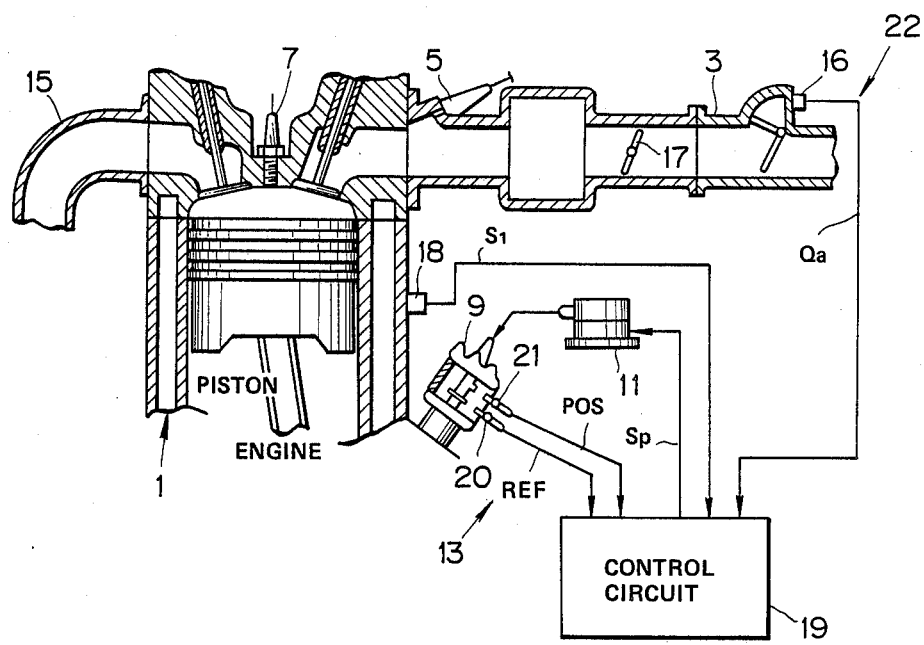
FIG. 1 is a schematic block diagram of a system for controlling ignition timing in a preferred embodiment according to the present invention.

FIG. 1 shows the configuration of an ignition timing control system according to the present invention as applied to an internal combustion engine.

As shown in FIG. 1, intake air is introduced through an air cleaner (not shown) and supplied to each engine cylinder of an engine 1 via an intake air pipe 3. On the other hand, fuel is injected through an injector 5 under the control of an injection signal inputted to the injector 5. Each engine cylinder is provided with an ignition plug 7. Each ignition plug 7 receives a high-voltage surges from an igniter 11 via a distributor 9. The ignition plugs 7, distributor 9, and ignitor 11 constitute ignition means. The ignition means generates and discharges the high-voltage surges under the control of the incoming ignition signal Sp. The air-fuel mixture within the engine cylinder is ignited and burned by the discharge of the high-voltage surge across a spark gap of the corresponding ignition plug 7 and thereafter the resulting exhaust gas is exhausted through an exhaust pipe 15. The intake air quantity Qa is measured by means of an air flow sensor 16 and is controlled by means of a throttle valve 17 within the intake air pipe 3. A knocking sensor 18 is mounted on each cylinder or on the engine body 1 for detecting combustion pressure within each or just one representative cylinder. The knocking sensor 18 comprises a vibration pressure responsive element, such as a piezoelectric element, or a magnetostrictor. The output signal $S_1$ of the knocking sensor 18 is sent to a control circuit (control unit) 19. The control unit 19 determines whether the engine is knocking on the basis of the output signal $S_1$ of the knocking sensor 18. A pair of crank angle sensors 20, 21 are installed within the distributor 9, respectively. One crank angle sensor 20 determines a cylinder number which is the basis of an ignition order and the other crank angle sensor 21 detects the angular position, or crank angle, of an engine crankshaft via the distributor 9. The first crank angle sensor 20 produces a pulse (hereinafter, referred to as REF signal) each time the distributor shaft (linked indirectly with the engine crankshaft) rotates through 60 degrees, i.e., whenever the engine crankshaft rotates through 120°. The pulse rises, e.g., at an angular position of a piston 70° before the top dead center (TDC) of the compression stroke. The pulsewidth of this pulse (the crank angle between its rising time to its falling time) is different for different cylinders. The other crank angle sensor 21 produces 360 pulses as the distributor shaft rotates through one revolution, and thus produces a rising or falling pulse for each one degree of crank angle CA (hereinafter referred to as POS signal). The REF and POS signals are exemplified by a U.S. patent application Ser. No. 861,006, filed on May 8, 1986, now U.S. Pat. No. 4,690,124. The contents of this U.S. Patent are hereby incorporated by reference. The air flow sensor 16 and crank angle sensors 20, 21 constitute engine operating condition detecting means. The REF signal, POS signal, and Qa signal are inputted to the control unit 19 which executes the ignition timing control procedure on the basis of these sensor data. (Although the control unit also performs injection quantity control, description thereof is omitted.)

Figure 2:
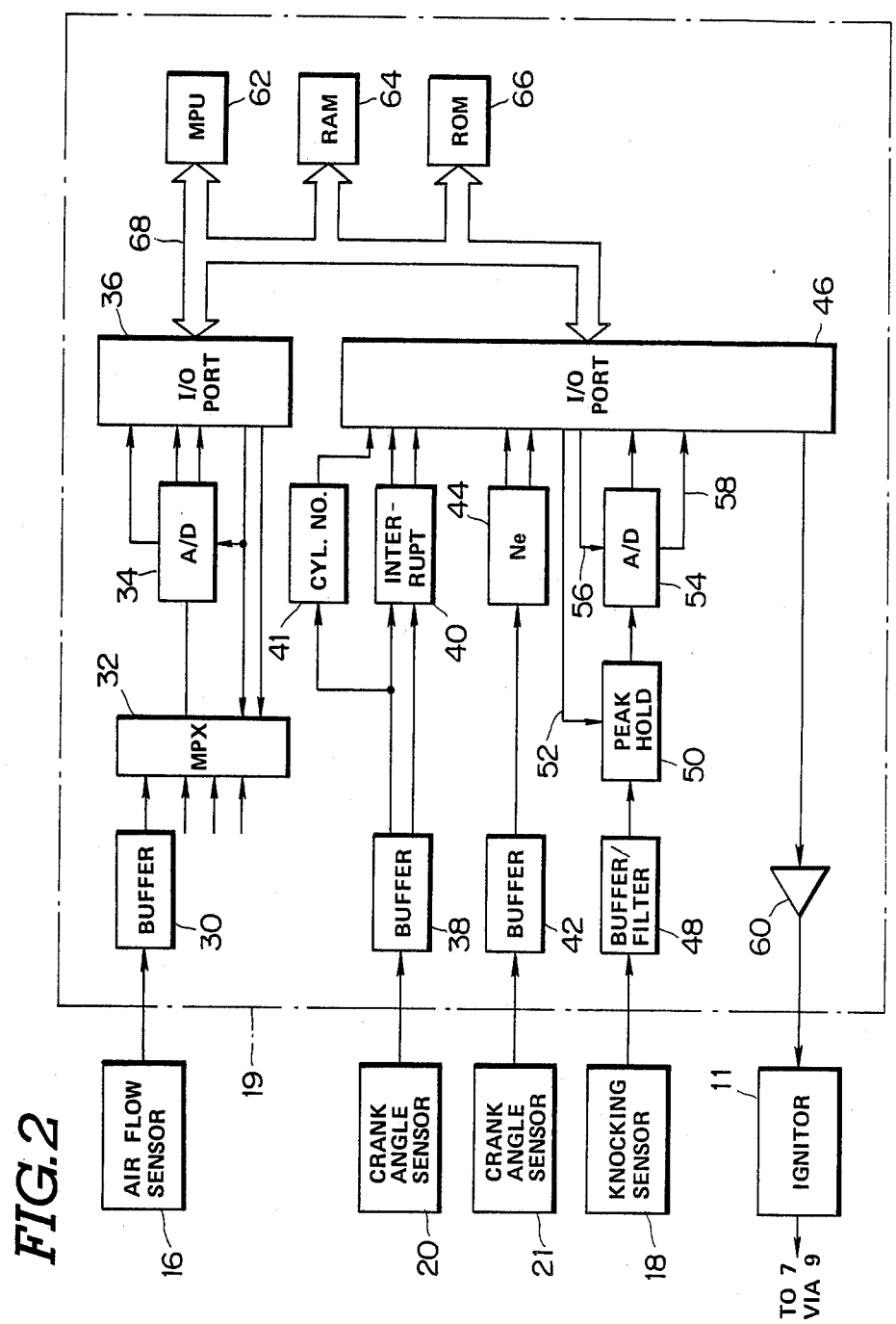
FIG. 2 is a schematic internal circuit block diagram of a control circuit shown in FIG. 1.

FIG. 2 is a circuit block diagram of the internal construction of the control unit 19. An intake air quantity signal Qa derived from the air flow sensor 16 is sent to an analog multiplexor 32 via a buffer 30. After the intake air quantity signal Qa is selected according to a command from a microprocessing unit (MPU) 62 and is converted into a digital signal by means of an A/D converter 34, the digital quantity signal is sent to a microcomputer via an Input/Output Port 36. The microcomputer is made up of Input/Output Ports (I/O Ports) 36, 46, common data bus 68, MPU 62, RAM (Random Access Memory) 64, and ROM (Read Only Memory) 66.

The REF signal derived from the crank angle sensor 20 is inputted to an interrupt request signal generation circuit 40 and cylinder number determination circuit 41 via a buffer 38. In addition, the POS signal derived from the other crank angle sensor 21 is inputted to the interrupt request signal generation circuit 40 and engine revolution speed signal generation circuit 44. The cylinder number determination circuit 41 determines the current cylinder to be ignited from the pulsewidth of the REF signal, forms a binary code identifying the determined cylinder number, and sends the binary code to the microcomputer. The interrupt signal generation circuit 40 forms the interrupt request signal for each predetermined crank angle CA from the REF signal and POS signal and sends the interrupt request signal via the I/O port 46 to the microcomputer. The engine revolutional speed signal generation circuit 44 generates the binary code signal representing the engine revolution speed Ne from a period of the POS signal. The binary code signal is then sent to the microcomputer via the I/O port 46. The output signal $S_1$ derived from the knocking sensor 18 is inputted to a peak hold circuit 50 via a circuit 48 comprising a buffer for impedance conversion and a band-pass filter for enabling a passage of signal components in a frequency band inherent to engine knocking (7 through 8 kHz). The peak hold circuit 50 holds the maximum amplitude (peak value a) of the output signal $S_1$ from the knocking sensor 18. The output signal of the peak hold circuit 50 is converted into a binary signal by means of the A/D converter 54 and is sent to the microcomputer via the I/O Port 46. The analog-to-digital conversion by means of the A/D converter 54 is started in response to an analog-to-digital conversion activation signal derived from the I/O Port 49 and line 56. When the A/D conversion is ended, the A/D converter 56 sends a signal indicating that the analog-to-digital conversion has been completed to the microcomputer via a line 58 and I/O Port 46. Hence, the knocking sensor 18, buffer/filter circuit 48, peak-hold circuit 50, and A/D converter 58 constitute knocking detection means.

On the other hand, when the ignition signal Sp is outputted to a drive circuit 60 via the Input/Output Port 46, the ignitor 11 is energized in response to the ignition signal Sp serving as a drive signal so that the ignition control is carried out under the control of the ignition signal Sp.

A basic ignition timing value $SA_o$ is stored in the ROM 66 in a predetermined three-dimensional table according to the engine speed Ne and intake air quantity per engine revolution (pressure in the intake air duct in cases where the pressure-responsive sensor detects pressure downstream of the throttle valve 17 in place of the air flow sensor 16). In this way, the control unit 19 comprises a microcomputer, buffers 30, 38, and 42, buffer/filter 48, peak hold circuit 50, A/D converters 34, 54, cylinder number determination circuit 41, interrupt request signal generation circuit 40, engine speed signal generation circuit 44, analog multiplexor 32, and drive circuit 60. The control unit 19 constitutes region determination means, storage means, read means, learning value correction means, retardation angle correction quantity calculating means, and ignition timing setting means.

The action of the preferred embodiment will be described below.

First, processing routines in the preferred embodiment according to the present invention will be described. It should be noted that although numerical values used below are most convenient for explaining the action of the preferred embodiment, the present invention is not limited to these numerical values and the numerical values are selected as optimum values for individual engines.

Figure 3:
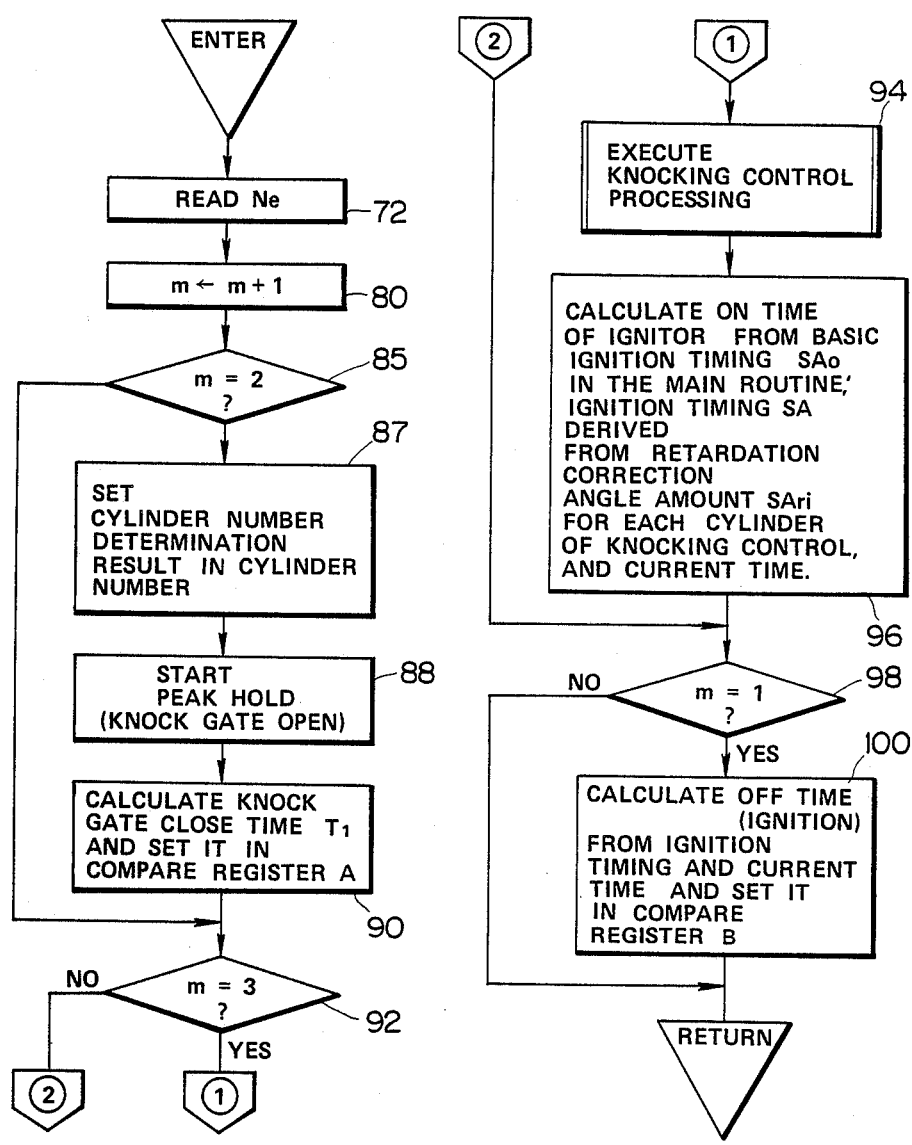
FIGS. 3 through 7 are operation flowcharts representing processing routines executed in the control circuit shown in FIGS. 1 and 2.
Figure 4:
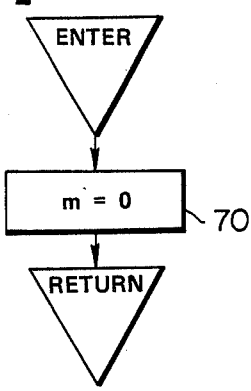

When the interrupt request signal for each predetermined crank angle CA, i.e., the interrupt request signal at the rising edge of the REF signal (hereinafter, referred to as REF interrupt) and at ATDC 30° and ATDC 60° (After Top Dead Center in the explosion stroke of each cylinder) are sent from the interrupt request signal generation circuit 40 into the MPU 62, the MPU 62 executes interrupt processing routines shown in FIGS. 3 and 4. A main routine shown in FIG. 3 mainly samples the peak value of the signal $S_1$ from the knocking sensor 18 and determines the presence or absence of knocking therefrom. The subroutine shown in FIG. 4 resets the count value m of a crank angle counter. When the REF interrupt request signal is received, the routine shown in FIG. 4 is executed. In a step 70, the count value m is reset and control is returned to the main routine. Since the rise of the REF signal appears at the crank angle CA 70° before the top dead center (70° BTDC), the count value m is reset at the crank angle CA 70° before the top dead center of each cylinder. When the angle interrupt request signal is received, the main routine shown in FIG. 3 is executed. The engine speed value Ne derived from the engine speed signal generation circuit 44 is fetched in a step 72. Next, in a step 80, the count value m of the crank angle counter is incremented by +1.

FIG. 8(A) shows the relationship between the above-described count value m and the crank angle CA.

Next, in a step 86, the MPU 62 determines whether or not the count value m is two, i.e., whether the piston has reached the top dead center (TDC) of the compression stroke of the current cylinder. The routine goes to a step 92 if the piston has not yet reached the TDC. Otherwise, the routine goes to a step 87 once the piston reaches the TDC of the current cylinder.

Next, in a step 88, a knock gate in the peak hold circuit 50 is open to start holding the peak value. In a step 90, the knock gate is closed and a time $t_1$ at which the holding of the peak value is stopped is calculated and stored in a compare register A.

Figure 5:
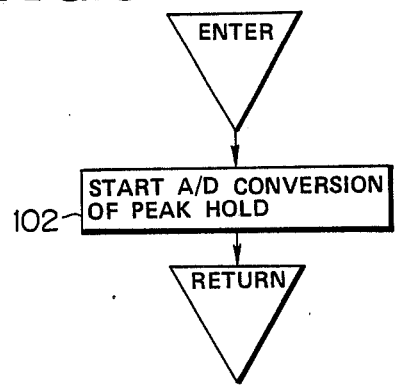
Figure 6:
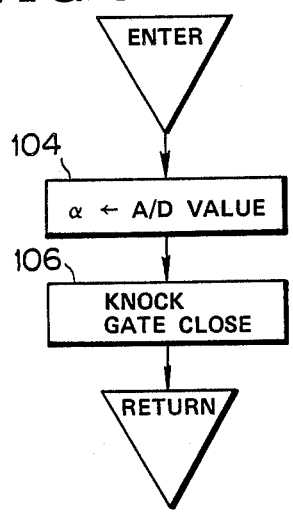

At the time $t_1$, a time conicidence interrupt routine shown in FIG. 5 is executed. In a step 102, the analog-to-digital conversion of the peak hold value is started. When the analog-to-digital conversion is ended, the analog-to-digital converter 54 issues an end report signifying completion of analog-to-digital (A/D) conversion to the MPU 62. Upon receipt of the end report, an A/D conversion end interrupt routine shown in FIG. 6 is executed. In this routine, the A/D converted value is stored in a predetermined area in the RAM 64 as a peak value a in a step 104. In a step 106, the knock gate is closed and control is returned to the main routine.

FIGS. 8(B) and 8(C) show the timings at which the knock gate is opened and closed in the above-described interrupt routine.

Next, the MPU 62 determines whether or not the count value m is three, that is to say, if the piston has reached 30 degrees after the top dead center in the explosion stroke. If the piston has not yet reached 30° ATDC, the routine goes to a step 98. On the other hand, once the piston reaches 30° ATDC, the MPU 62 checks to determine whether the engine is knocking in a step 94. If so, a knocking control processing is executed in which a retardation angle correction amount is calculated. The knocking control processing is executed in an interrupt processing routine for each 30° ATDC in FIG. 9 (refer to FIG. 8(D)).

Next, in a step 96, a basic ignition timing value $SA_o$ is calculated by interpolation of a map representing the basic ignition timing stored in the ROM 66 in the main routine (not shown). (This map is exemplified by a copending U.S. patent application Ser. No. 749,441 filed on June 27, 1986, now U.S. Pat. No. 4,660,535. This U.S. Patent document is hereby incorporated by reference.) Then, the basic timing value and a correction retardation angle amount $SA_{ri+1}$ (i denotes a cylinder number and i+1 denotes the next cylinder to be ignited. Hence, when i+1=6, it is assumed to be zero.) allocated to each cylinder for controlling the engine knocking are used to calculate the desired, actual ignition timing SA ($SA = SA_o - SA_{ri+1}$) Then, the on-time of the ignitor 11 is calculated from the ignition timing SA and current time and is set in the compare register B (refer to FIG. 8(E)). In the subsequent step 98, the MPU 62 determines whether the count value m is 1 or not, i.e., whether the piston has reached 60 degrees after the top dead center (60° ATDC) in the explosion stroke for each cylinder. If the piston has not yet reached 60° ATDC, control is returned to the main routine. Once the piston reaches 60° ATDC, the off-time at which the ignitor 11 is turned off is calculated from the ignition timing SA and current time and is set in the compare register B, and control is returned to the main routine. The on-time and off-time of the ignitor 11 is also exemplified by the U.S. patent application Ser. No. 861,006, filed on May 8, 1986, now U.S. Pat. No. 4,660,535. This U.S. Patent is hereby incorporated by reference.

Figure 7:
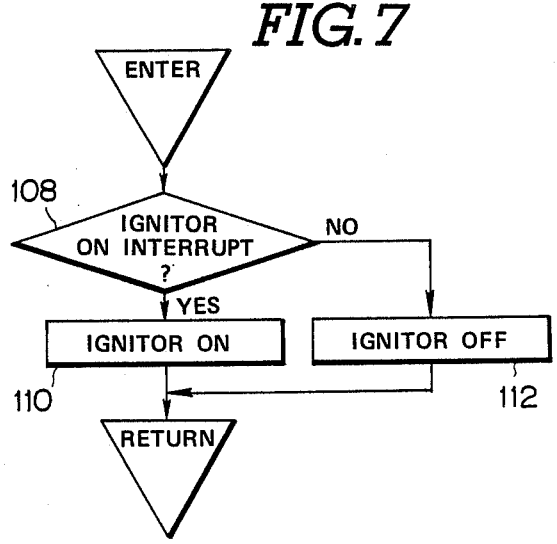
Figure 10:
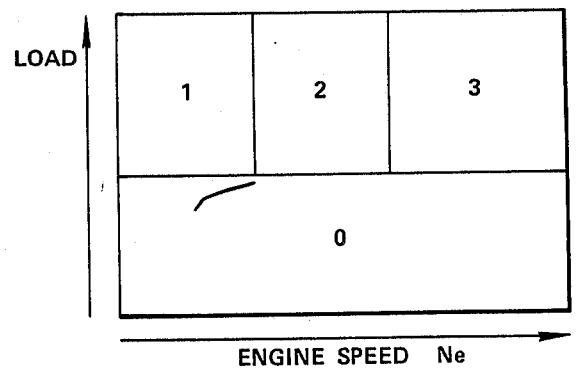
FIG. 10 is a schematic diagram representing engine operating regimes.

Upon the arrival of each time set in the steps 96 and 100, the time coincidence interrupt processing routine shown in FIG. 7 is executed. The MPU 62 determines in a step 108 whether it is an interrupt of an ignitor on set in the step 96. When it is the interrupt of ignitor on, the ignitor 11 is turned on in a step 110. On the other hand, when it is the interrupt of ignitor off set in the step 100, the ignitor 11 is turned off and the routine returns to the main routine. Consequently, the ignition of air-fuel mixture supplied to the corresponding cylinder is carried out at the ignition timing SA to be executed.

Figure 9:
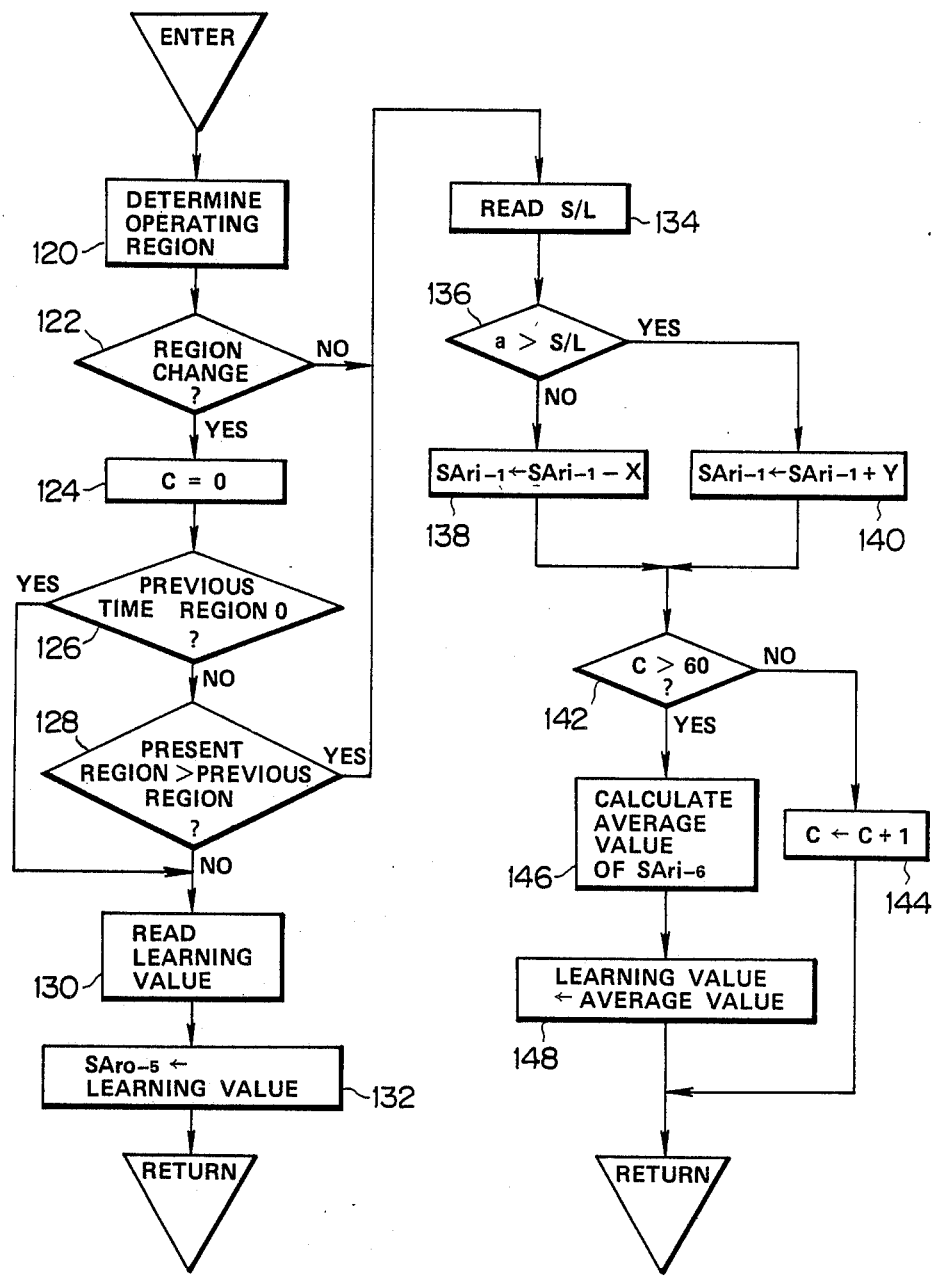
FIG. 9 is a detailed operation flowchart representing an execution program by which the knocking control is processed.

Next, the contents of the knocking control processing in the step 94 of FIG. 3 will be described in details with reference to a flowchart representing a subroutine shown in FIG. 9.

In this flowchart, the MPU 62 determines the occurrence of knocking according to a magnitude of the peak value a derived in the step 104 of FIG. 6 and calculates the retardation angle correction amount $SA_{ri}$ for each cylinder. In addition, the MPU 62 determines when the engine operation falls within the engine operating region r, stores a learning value allocated to the engine operating region r when the current operating region r is changed from the previous operating region as the retardation angle correction amount $SA_{ri}$, and newly calculates the learning value from the subsequent retardation angle correction amount $SA_{ri}$.

First, the MPU 62 determines the operating region r on the basis of the engine operating condition, in a step 120. Then, the operating region r is divided, e.g., into a low load region (0) and three subdivided high load regions (1 through 3) according to the engine speed Nr. Hence, when the current engine operation is at a low load, numeral zero is stored in the corresponding operating region r. At the time of a high load and low engine speed (, e.g., less than 1800 r.p.m), numeral one is stored in the corresponding operating region r. At the time of a high load and intermediate engine speed (, e.g., equal to or more than 1,800 r.p.m and less than 2400 r.p.m), numeral two is stored in the corresponding operating region r. At the time of a high load and high engine speed (, e.g., equal to or more than 2400 r.p.m), numeral 3 is stored in the corresponding operating region r. It is noted that the operating region determined at the previous processing is stored in a previous operating region rb in the previous processing.

Next, in a step 122, the MPU 62 determines whether the current operating region r is changed from the previous operating region rb. This determination is based on whether the current region r is equal to the previous region rb. If the operating region r is not changed, the routine goes to a step 134. If the operating region r is changed, the routine goes to a step 124. The count value C is reset which measures a lapse time upon the change in the operating region in the step 124.

Next, the MPU 62 determines how the operating region r is changed in the steps 126 and 128. That is to say, the MPU 62 determines whether the previous region rb indicates zero (rb=0). If rb=0, the MPU 62 determines that the engine operation is transferred from the low load region (O) to one of the high load regions (1 through 3) and the routine goes to a step 130. On the other hand, if rb≠0, the routine goes to the step 128. In the step 128, the MPU 62 compares the current operating region r with the previous operating region rb. If r>rb, the MPU 62 determines that the engine speed Ne increases in the high load region (1 through 3) (acceleration driving) and the routine goes to a step 134. If r<rb, the MPU 62 determines that th engine speed Ne is reduced in the high load region (1 through 3) (for example, an acceleration change in an automatic transmission of the vehicle) or determines that the engine operation is changed from the high load region (1 through 3) to the low load region (0). Then the routine returns to a step 130.

In the step 130, the MPU 62 reads one of the learning values allocated to the respective operating regions r which is allocated to the corresponding operating region. In a step 132, the MPU 62 stores this learning value as the correction retardation angle amount $SA_{ri}$ of each cylinder and ends this routine. The processing flows subsequent to the step 134 are executed respectively depending on whether the engine is operated in the same operating region r or the engine is operated with the engine speed Ne increasing in the high load region (1 through 3).

In the step 134, the MPU 62 reads a reference value S/L preallocated according to the engine operating condition and compares the currently detected above-described peak value with the reference value S/L in a step 136. If a>S/L in the step 136, the MPU 62 determines that the knocking has occurred and the routine goes to a step 140. In the step 140, the retardation angle correction amount $SA_{ri-1}$ is corrected toward the retardation angle side as $SA_{ri-1}+Y$. In this case, symbol Y denotes, e.g., a crank angle CA of 1°. When a<SL, the MPU 62 determines that the engine knocking does not occur and the routine goes to a step 138. In the step 138, the MPU 62 corrects the retardation angle correction amount $SA_{ri-1}$ toward the advance angle side as $SA_{ri-1}-X$. In this case, symbol X denotes, for example, 1° crank angle CA.

Next, the MPU 62 determines whether the count value C indicating the lapse time after the operating region is changed exceeds a predetermined value (for example, 60). If the count value C does not exceed the predetermined value, the count value C is incremented by one in a step 144 and the routine is ended. When the count value C indicates 61, the routine goes to a step 146 in which an average value from the retardation angle correction amounts $SA_{ro}$ to $SA_{r5}$ allocated to the respective cylinders is calculated. In a step 148, the average value is stored as the learning value allocated to the operating region r and this routine is ended.

Figure 11:
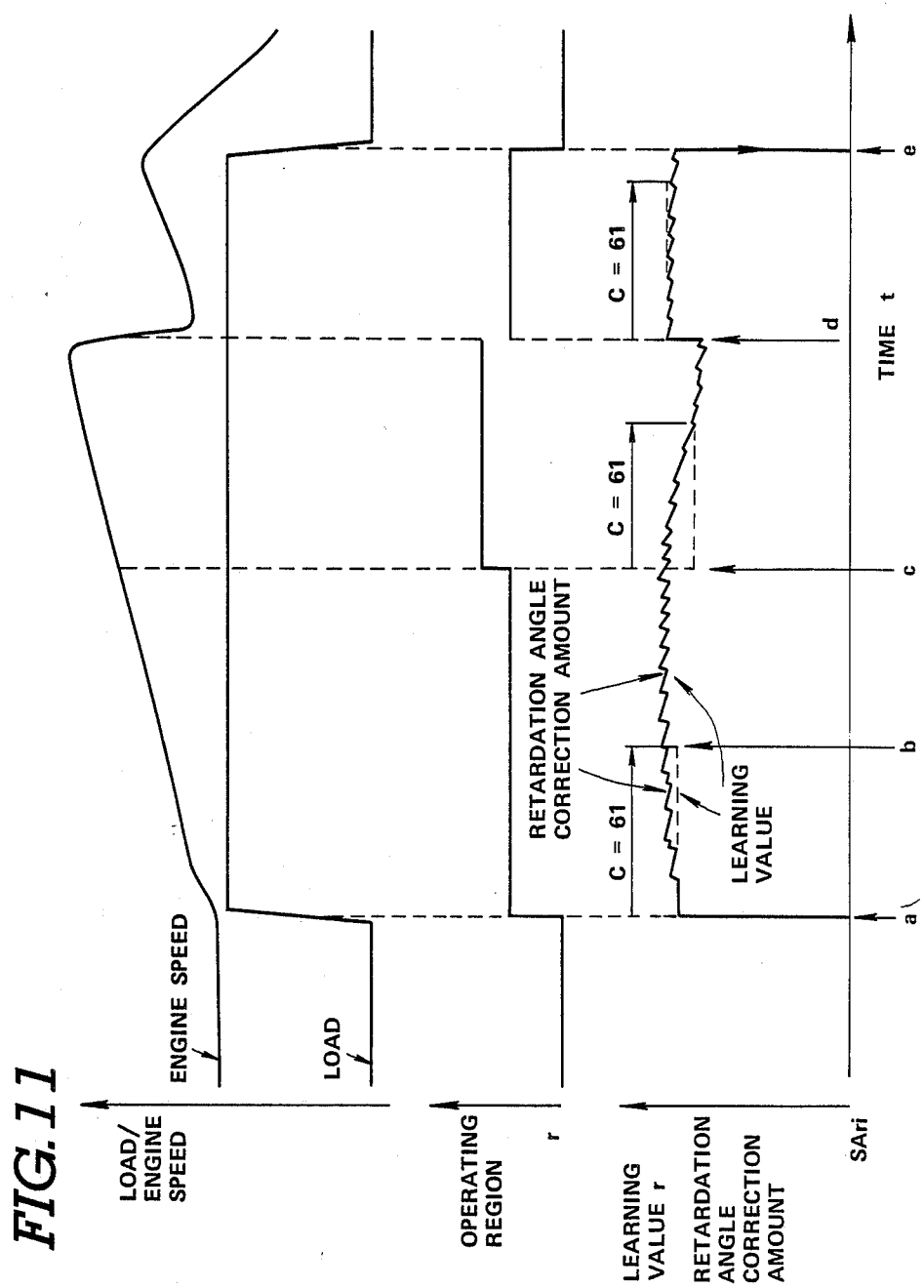
FIG. 11 is an operation timing chart for explaining the action of the ignition timing control system shown in FIGS. 1 through 10.

Next, FIG. 11 shows a change of the learning value and retardation angle correction amount $SA_{ri}$ with respect to lapse time due to the change in the above-described operating region.

As shown in time position a of FIG. 11, when the engine operating state is changed from the low load region (O) to the high load region (1 through 3), the learning value allocated to the region is read when the engine operating condition is transferred from the low load region (O) to the high load regions (1 through 3). Thereafter, when the engine operation in the same operating region r is continuously carried out and the count value C indicates 61, the retardation correction amount $SA_{ri}$ according to the peak value a is corrected and calculated and the average value of the retardation angle correction amounts for the whole cylinder becomes the present learning value in the current operating region r (refer to b in FIG. 11).

When the region r is changed with the increase in the engine speed Ne in the high load regions (1 through 3), the determination of the engine knocking and calculation of the retardation angle correction amount $SA_{ri}$ continuously carried out (refer to c in FIG. 11). At this time, the learning value is not stored as the retardation angle correction amount $SA_{ri}$. This is because the ignition timing is abruptly changed during a continuous acceleration and the performance is reduced. Therefore, in this case, the reduction of the performance can be prevented and the improvement of the fuel economy can be achieved.

When the engine speed Ne is reduced in the high load regions (1 through 3) and the operating region r is changed, the learning value is stored as the retardation angle correction amount $SA_{ri}$ (refer to d in FIG. 11). In general, a difference between the engine MBT ignition timing (basic ignition timing) and the knocking permissible ignition timing (that is to say, a converged value of the retardation angle correction amount $SA_{ri}$) becomes larger as the engine speed decreases in the high load regions (1 through 3). Hence, as the engine speed Ne abruptly drops in the high load regions (1 through 3), the knocking occurs.

However, since in this case the optimum retardation angle correction amount $SA_{ri}$ is provided through the learning processing, the occurrence of engine knocking can effectively be suppressed and the engine performance and fuel economy can be improved.

In addition, the learning value is stored as the retardation angle correction amount when the engine operation is transferred from the high load regions (1 through 3) to the low load region (0) (refer to e of FIG. 11). In this case, since no knocking occurs even during the execution of ignition under the basic ignition timing condition, the learning value accordingly indicates substantially zero crank angle CA. Hence, since the ignition is carried out at the basic ignition timing $SA_o$, reductions of the performance and fuel economy can be prevented.

As described hereinabove, since in the system and method for controlling the ignition timing according to the present invention the updating of the learning value only at the time of increase in engine speed is inhibited, an opportunity for updating the learning value is increased. In addition, since an optimum retardation amount can be provided according to the change in the operating region regardless of the individual difference in performance between engines and in engine operating environments, the occurrence of knocking can be prevented. Furthermore when the engine speed is increased or decreased in the high engine speed regions or when the engine is transferred from the high load region to the low load region, the engine performance and fuel economy can be improved.

It will clearly be understood by those skilled in the art that the foregoing description is made in terms of the preferred embodiment and various changes and modifications may be made without departing from the scope of the present invention which is to be defined by the appended claims.

What is claimed is:

1. A system for controlling ignition timing for an internal combustion engine, comprising:
    (a) first means for detecting an engine operating condition;
    (b) second means for detecting an occurrence of engine knocking in the engine;
    (c) third means for determining a current engine operating region on the basis of the engine operating condition detected by the first means;
    (d) fourth means for setting a basic ignition timing angle on the basis of the engine operating condition detected by said first means;
    (e) fifth means for learning a retardation angle correction amount by which the set basic ignition timing angle is corrected toward a retardation angle side so as to suppress the engine knocking when the second means detects the occurrence of engine knocking as that corresponds to the similar engine operating region and storing a learning value of the retardation angle correction amount into a predetermined memory area allocated according to the corresponding engine operating region;
    (f) sixth means for reading the learning value as the retardation angle correction amount when the engine operating region is changed to a predetermined engine operating region from the predetermined area in said fifth means;
    (g) seventh means for calculating the retardation angle correction amount on the basis of the retardation angle correction amount read by the sixth means and depending on whether the engine knocking occurs in at least one of the cases when the engine operating region remains unchanged and when the engine operating region is changed to the predetermined operating region; and
    (h) eighth means for producing an ignition signal upon the receipt of which air-fuel mixture supplied to the engine is ignited at a timing of the set basic ignition timing angle which is corrected by the retardation angle correction amount calculated by the seventh means.

2. The system according to claim 1, which further comprises ninth means for correcting the retardation angle correction amount calculated by said seventh means only when the engine operating region is such that a speed of the engine is increased to the predetermined operating region, and for halting the storage of the corrected retardation angle correction amount in the predetermined memory area as a new learning value.

3. A method for controlling an ignition timing for an internal combustion engine, comprising the steps of:
    (a) detecting a peak value of a magnitude of an engine cylinder pressure vibration during a predetermined interval of a crank angular displacement;
    (b) detecting an engine operating condition;
    (c) determining a current engine operating region on the basis of the engine operating condition detected in the step (b), said current operating region corresponding to one of a plurality of predetermined operating regions;
    (d) detecting whether the current engine operating region is changed from a previously detected engine operating region;
    (e) reading from a memory a learning value allocated to the predetermined operating region that corresponds to the current operating region when the engine operating region is changed;

(f) storing the learning value as a retardation angle correction amount ($SA_{ri}$) for each engine cylinder;

(g) reading a reference value (S/L) preallocated to the engine operating condition detected in said step (b) in at least one of the cases when the engine operating region is not changed based on the determination made in step (d) and when an acceleration operation is carried out, the determination of whether the acceleration operation carried out on the basis of the change in the engine operation region;

(h) determining whether an engine knocking occurs on the basis of a comparison result between the preallocated reference value and the peak value detected in the step (a);

(i) calculating the retardation angle correction amount depending on whether the engine knocking occurs determined in the step (h);

(j) determining whether a predetermined interval, during which a change in operating region has occurred, has elapsed;

(k) calculating an average value of the retardation angle correction amount ($SA_{r0}$ through $SA_{r5}$) and storing the average value in a predetermined engine operating region as the learning value when the predetermined interval in the step (j) has elapsed;

(l) determining a basic ignition timing angle value on the basis of the engine operating condition detected in the step (b);

(m) calculating an ignition timing to be executed from the basic ignition timing angle value determined in the step (l) and the retardation angle correction amount allocated to each cylinder; and (n) igniting air-fuel mixture supplied to each cylinder at the ignition timing calculated in the step (m).

4. The method according to claim 3, wherein said step (d) detects whether the current engine operating region is changed from the previous engine operating condition depending on whether the current operating region determined in said step (c) is the same as the engine operating region previously determined in said step (c).

5. The method according to claim 3, wherein said step (e) reads the learning value allocated to the predetermined one of the engine operating regions when an engine revolution speed is decreasing in a first predetermined engine operating region.

6. The method according to claim 3, wherein said step (e) reads the learning value allocated to the predetermined one of the engine operating regions when the engine operating region is changed from a first predetermined engine operating region to a second predetermined engine operating region, an engine load of the first predetermined engine operating region being higher than that of the second engine operating region.

7. The method according to claim 3, wherein said step (i) calculates the retardation angle correction amount so as to increment its value by a predetermined crank angle when said step (h) determines that the engine knocking occurs.

8. The method according to claim 7, wherein said step (i) calculates the retardation angle correction amount so as to decrement its value by the predetermined crank angle when said step (h) determines that the engine knocking does not occur.

9. The method according to claim 3, wherein said steps (h), (i) and (j) are repeated until the predetermined interval has elapsed when the acceleration operation is carried out with an engine load exceeding a predetermined value.

* * * * *